(12) United States Patent
Hayman

(10) Patent No.: US 8,876,434 B2
(45) Date of Patent: Nov. 4, 2014

(54) METHOD AND DEVICE FOR INSTALLING A TIDAL POWER PLANT

(75) Inventor: Jason Hayman, London (GB)

(73) Assignee: Voith Patent GmbH, Heidenheim (DE)

( * ) Notice: Subject to any disclaimer, the term of this patent is extended or adjusted under 35 U.S.C. 154(b) by 200 days.

(21) Appl. No.: 13/390,907

(22) PCT Filed: Jul. 1, 2011

(86) PCT No.: PCT/EP2011/003269
§ 371 (c)(1),
(2), (4) Date: Jul. 20, 2012

(87) PCT Pub. No.: WO2012/019673
PCT Pub. Date: Feb. 16, 2012

(65) Prior Publication Data
US 2012/0275865 A1    Nov. 1, 2012

(30) Foreign Application Priority Data

Aug. 9, 2010  (DE) .................. 10 2010 033 788

(51) Int. Cl.
*E02B 9/08* (2006.01)
*F03B 17/06* (2006.01)
*F03B 13/26* (2006.01)
(52) U.S. Cl.
CPC ........... *F03B 17/061* (2013.01); *F05B 2230/70* (2013.01); *F05B 2230/6102* (2013.01); *Y02E 10/28* (2013.01); *F03B 13/264* (2013.01)
USPC ............................. 405/205; 405/203; 405/206
(58) Field of Classification Search
CPC .. E02B 9/08; E02B 2017/0091; F03B 13/264
USPC .............. 405/23, 203, 205, 206, 209; 60/495; 290/42, 43, 53, 54
See application file for complete search history.

(56) References Cited

U.S. PATENT DOCUMENTS

| | | | | |
|---|---|---|---|---|
| 3,036,438 | A | * | 5/1962 | Sims ............................. 405/206 |
| 2012/0202369 | A1 | * | 8/2012 | Blaxland ....................... 439/271 |
| 2013/0333371 | A1 | * | 12/2013 | Vigars et al. ..................... 60/495 |

FOREIGN PATENT DOCUMENTS

| | | | |
|---|---|---|---|
| DE | 10 2008 032 625 | | 8/2009 |
| DE | 10 2008 020 964 | | 10/2009 |
| DE | 10 2008 020 965 | | 10/2009 |
| EP | 1 980 746 | | 6/2010 |
| FR | 2980221 | A1 * | 3/2013 |
| GB | 980575 | | 1/1965 |
| GB | 2 431 207 | | 4/2007 |
| GB | 2 431 628 | | 5/2007 |
| GB | 2 437 533 | | 10/2007 |
| GB | 2463697 | A * | 3/2010 |
| WO | WO 2004/015264 | | 2/2004 |
| WO | WO 2007/051968 | | 5/2007 |
| WO | WO 20070083105 | A1 * | 7/2007 |
| WO | WO 2009/124344 | | 10/2009 |

* cited by examiner

*Primary Examiner* — Benjamin Fiorello
*Assistant Examiner* — Kyle Armstrong
(74) *Attorney, Agent, or Firm* — Farjami & Farjami LLP

(57) ABSTRACT

There is provided a method for the installation of a tidal power plant having a water turbine, which is mounted so it is rotatable on a nacelle, the nacelle being assigned to a coupling device for placement of the tidal power plant on a coupling counterpart on a tower, which carries the tidal power plant during operation.

8 Claims, 7 Drawing Sheets

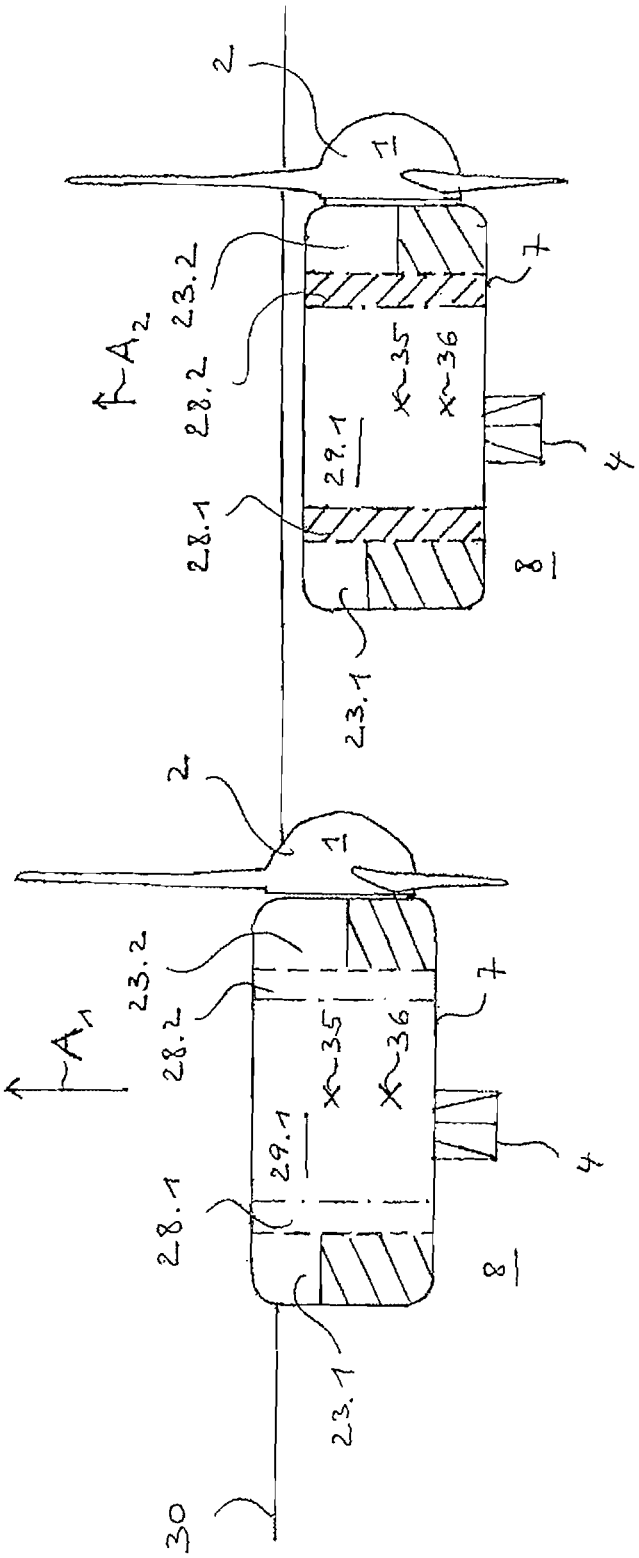

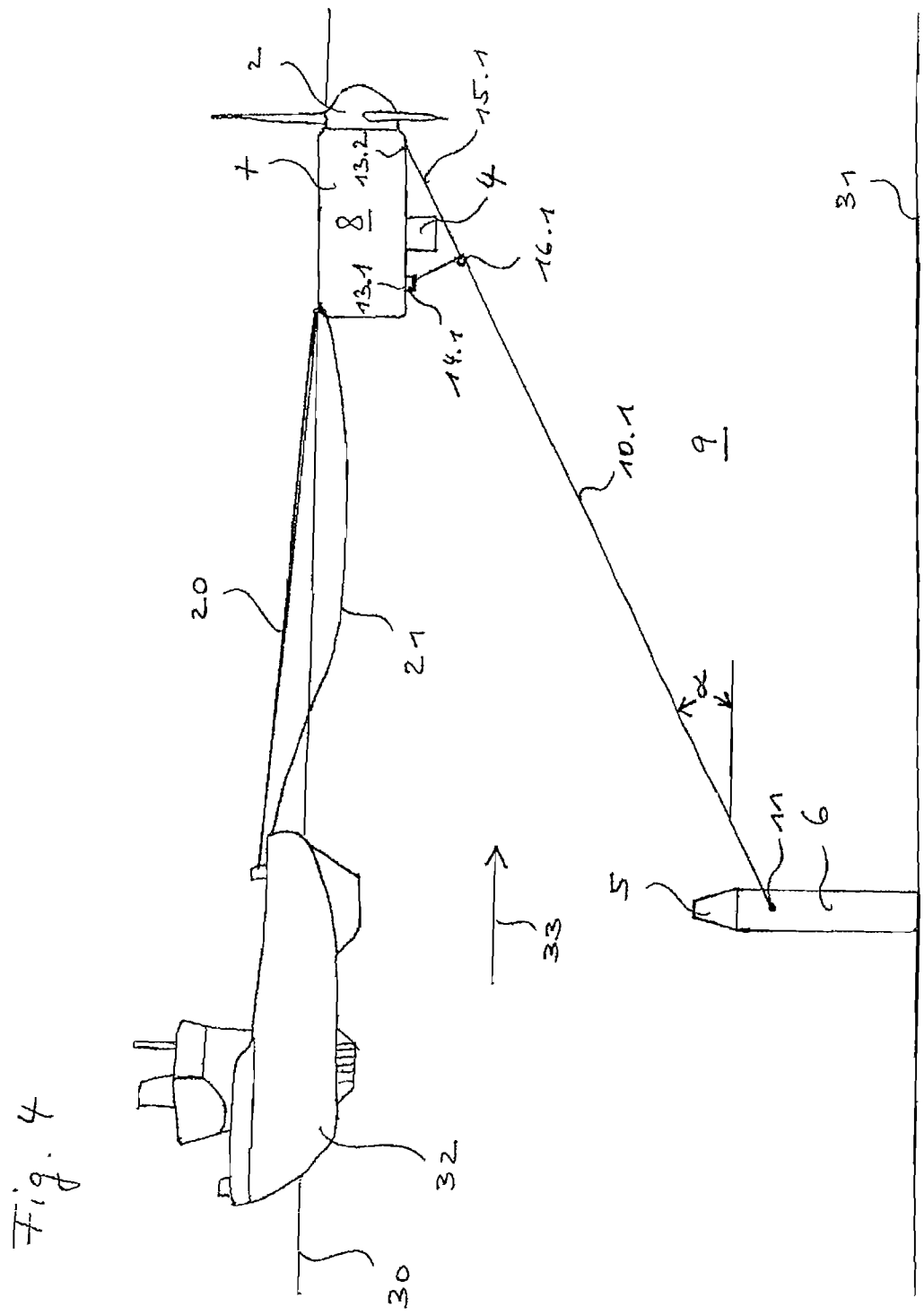

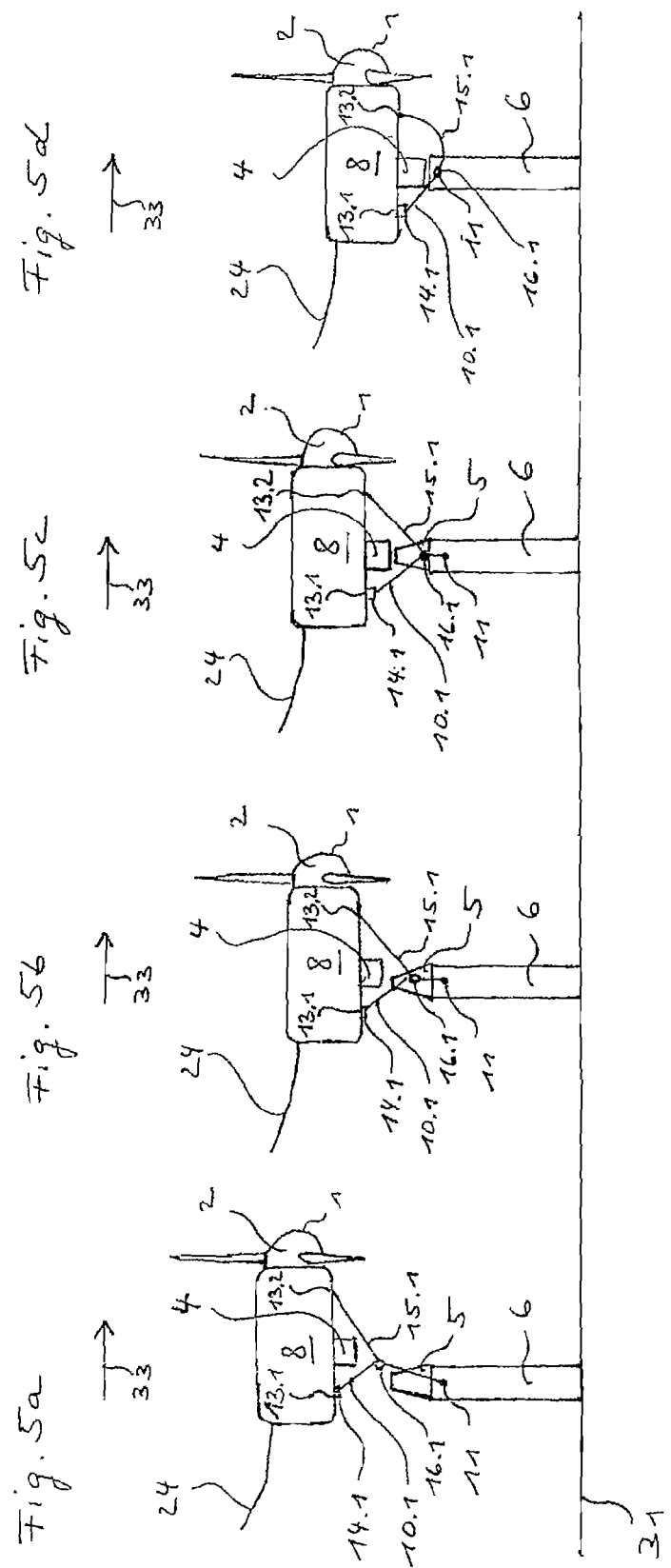

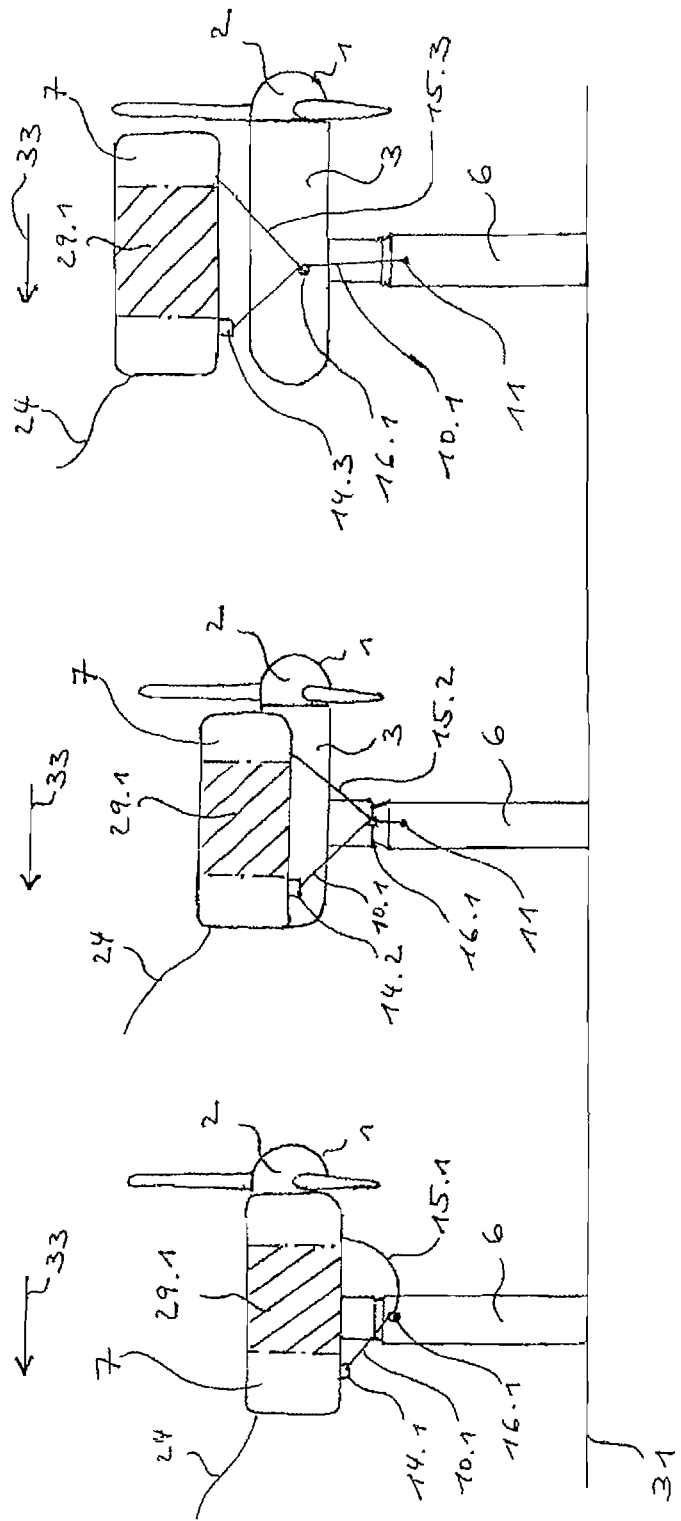

METHOD AND DEVICE FOR INSTALLING A TIDAL POWER PLANT

This is a U.S. national phase application, which is based on, and claims priority from, PCT application Serial No, PCT/EP2011/003269, filed Jul. 1, 2011, which claims priority from foreign application Serial No. 10 2010 033 788.9, filed Aug. 9, 2010, in Germany.

The invention relates to a method and a device for the installation of a tidal power plant on a support structure, which is floating or has a foundation on the floor of the body of water.

The use of water turbines having free flow around them has been proposed to obtain energy from an ocean current, in particular a tidal current. One possible embodiment provides a propeller-shaped water turbine, which is mounted so it is rotatable on a nacelle. An electrical generator which is driven by the water turbine is typically located inside the nacelle.

Economical usage of tidal currents presumes large-scale facilities, which are difficult to install because of their high weight and the facility location in the ocean. For this reason, it has been proposed that the aquatic vehicles used for the installation be specially adapted to the respective facility. For example, EP 1980746 B1 describes a floating pontoon having a central opening, which allows the placement of an entire facility, comprising a tidal power plant and the associated foundation at the facility location. Because of the high facility weight, this presumes that the special ship is equipped with correspondingly dimensioned lifting mechanisms and buoyancy capacities. Furthermore, the sinking of the entire facility including the foundation results in the consequent problems that the facility must be leveled on the floor of the body of water. In addition, the contact points of the foundation are to be secured after the placement.

To avoid these problems, it has been proposed that a facility installation be performed in two steps. Firstly, a foundation structure is erected after a seabed preparation. This can be a monopile foundation or the installation of a gravity foundation. A supporting structure, typically a tower, is raised over the actual foundation, on which the tidal power plant is placed in a second, following installation step on an assigned coupling device. Reference is made to DE 10 2008 020 965 A1 for such facilities, for example.

For the installation of a two-part facility, it is necessary to guide the tidal power plant having its coupling device precisely and securely against the coupling counterpart on the fixed support structure. For this purpose, lifting mechanisms were proposed in GB 24 37 533 A and DE 10 2008 032 625 B3, which are operated via a ship crane on an installation ship. The problems of such an installation method are that the forces acting on the ship because of the wind and wave movements are to be separated from the sinking procedure of the tidal power plant. For this purpose, regulated, load-decoupling crane systems come into consideration. However, such an approach results in a high expenditure for the positioning actuators of the lifting mechanism with respect to the large loads necessary for the installation of tidal power plants.

An additional difficulty in facility installation by means of a ship crane is that the critical final approach between the coupling device on the tidal power plant and the coupling counterpart of the support structure can only be monitored indirectly from the surface, for example, by means of a video system. Therefore, an installation method was proposed by WO 2004 015264 A1, for which guide cables are stretched between an installation vehicle and the support structure, along which the sinking of the facility occurs. This results in particular in the advantage that in the phase of the final approach, the tidal power plant is automatically guided along the final section of the guide cables to the coupling point. However, it is disadvantageous that the stretching of guide cables between the support structure and the installation vehicle located on the water surface is again influenced by wave movements. Uncontrolled movements of the tidal power plant to be sunk can occur due to the tensile stresses or slack in the cable system resulting therefrom, which increases the danger of damage to the coupling device in particular during the actual coupling procedure.

The invention is based on the object of specifying an installation device which is only slightly influenced by the wave movement on the water surface and an associated installation method. The installation device is to be reusable and scalable. Furthermore, it is only to require a small ship-side lifting capacity and is to allow rapid and secure installation. Furthermore, the installation device is to be capable of recovering a tidal power plant to be able to execute maintenance or a facility replacement.

The object on which the invention is based is achieved by the features of the independent claims. The inventors have recognized that for the installation of a tidal power plant on a submersible support structure, in particular a tower, the tidal power plant is to be provided with a removable floating device, the installation unit resulting through this coupling having an adjustable buoyancy force. The vertical force caused by the buoyancy allows the installation unit to be drawn toward the coupling device by means of a traction cable arrangement originating from the support structure.

The floating device is particularly preferably equipped with trimming tanks, in order to establish a defined attitude of the installation unit as a function of the incident flow, buoyancy, and traction cable forces and to guide the coupling device on the tidal power plant in a predetermined horizontal attitude to the coupling counterpart on the support structure by means of the traction cable arrangement. Furthermore, it is preferable to execute the hauling in of the tension cables of the traction cable arrangement via motorized winches on the floating device, Accordingly, the installation unit is drawn by its own force toward the support structure.

The floating device is implemented as simply and therefore as failsafe as possible. In addition to the cable winches, the compressed air system for the operation of ballast tanks and the controller required for this purpose are preferably integrated in the floating device. The power supply and preferably a control signal line for executing control and regulation tasks and/or the transmission of sensory data can then be guided up to beyond the water surface by means of a cable connection to a supply ship. In addition, for a preferred embodiment, the power cable of the tidal power plant is still connected to the facility at the water surface. The supply line and the power cable absorb essentially no load, so that with increasing submersion depth, the installation unit is decoupled from the force influences on the water surface, which result in particular from the wave movement. Correspondingly, the installation unit, in particular in the critical final phase of the tower approach, is substantially influenced by predictable force actions as a result of the incident flow and the adjustable buoyancy and traction cable forces.

The installation unit made of tidal power plant and floating device is towed by means of a ship vehicle to the installation location with substantially empty ballast tanks and therefore a sufficient safety reserve for the buoyancy. At the facility location, the traction cable arrangement is then constructed between the submersible support structure and the installation unit. A diving robot can be used for this purpose, which fastens the traction cables on the tower-side linkage points.

Alternatively, a permanent attachment of the traction cables on the support structure is presumed, the free ends of the traction cables either being held permanently via floating bodies on the water surface or being laid on the floor of the body of water in the area of the support structure via remotely operated floaters until the execution of the installation. Further embodiments are conceivable, for example, providing a hauling system for the fixed cables, which is applied in the interior of the support structure.

After the erection of the traction cable arrangement, the towing cable between the installation unit and the tugboat is decoupled and only the supply line to the ship vehicle is maintained. Ballast tanks of the floating device are then filled to reduce the buoyancy, this maintaining a positive value, so that the installation unit still remains capable of floating and is drawn toward the coupling device on the tower by means of the traction cable arrangement against the stabilizing force action by the buoyancy force.

The sinking of the installation unit is preferably performed under incident flow. This results in a lee-side location of the water turbine in the course of the approach to the support structure. Trimming tanks are provided for the attitude stabilization, which are preferably implemented as a closed system. Furthermore, the traction cable arrangement preferably comprises at least two traction cables spaced apart from one another. As a result of this, the buoyancy counteracts a rotational movement of the installation unit around the vertical axis, since this would result in twisting and shortening of the traction cable arrangement. Furthermore, multiple linkage points are provided on the floating device side for the traction cable arrangement for stabilization on the floating body. Motorized winches are preferably arranged on a part of these linkage points. Fixed cables go from the non-motorized linkage points to deflection rollers, around which the retrievable traction cables preferably have a not insignificant wrap angle until the coupling device on the tidal power plant is guided to the coupling counterpart on the tower.

After the placement of the installation unit and the execution of the coupling between the tidal power plant and the support structure, the floating device again releases the tidal power plant. To prepare for the load change accompanying this, load compensation tanks are filled on the floating device. In addition, one preferably waits for a change of the incident flow direction, in order to keep the floating device safely free of the water turbine through the flow pressure.

For a refinement of the invention, the floating device is used for a retrieval of a tidal power plant located in the operating position on a support structure. For this purpose, an approach of the floating device, which is provided with a positive buoyancy, via the above-explained traction cable arrangement to the submersed nacelle of the tidal power plant is performed. Guiding thereto under incident flow, so that the floating device is approached from the rear, i.e., from the side facing away from the water turbine, is again preferred.

In addition, to protect the water turbine, the floating device is first coupled in the area of the nacelle housing terminus on the side opposite to the water turbine. In order to avoid contact with the water turbine, an axial stop can also be provided on the floating device. Furthermore, the floating device is guided at a specific inclined attitude to the nacelle, whereby a first contact with the side opposite to the water turbine results. The horizontal attitude is only assumed in a following step, and the further coupling points in proximity to the water turbine are fixed between the tidal power plant and the floating device. The load compensation tank of the floating device is then emptied and one waits for a flow direction change, in order to guide the water turbine in a safe, inclined trajectory away from the support structure by means of uncoiling of the traction cable arrangement.

The invention is described in greater detail hereafter on the basis of a preferred exemplary embodiment in connection with figures, in which the following is shown in detail:

FIGS. 3a and 3b show the initiation of the installation method according to the invention.

FIG. 4 shows an installation unit according to the invention, which is connected at the beginning of the installation to a tugboat and to a tower supported against the floor of the body of water.

FIGS. 5a-5d show the final approach of an installation unit according to the invention to the tower up to the placement of the coupling device on the nacelle of the tidal power plant on a coupling counterpart on the tower.

FIGS. 6a-6c show the procedure of decoupling a floating device according to the invention from a tidal power plant, after it has been installed on the tower in the operating position.

Figure 1:
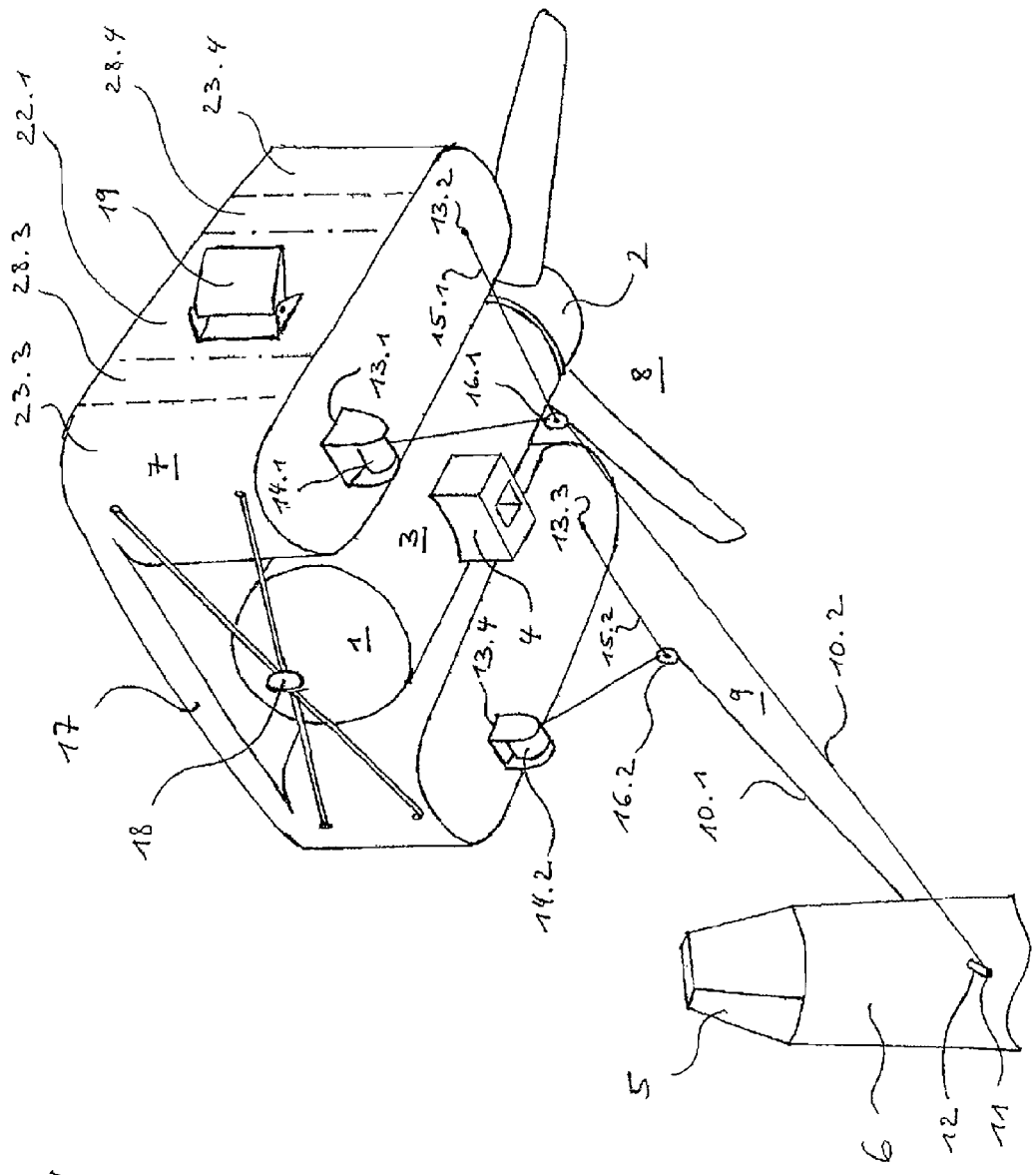
FIG. 1 shows an installation unit according to the invention for placing a tidal power plant on a support structure in the form of a tower.

FIG. 1 shows a floating device 7 according to the invention in schematically simplified form, to which a tidal power plant 1 according to the species is coupled. Through the coupling, an installation unit 8 results, which is used for the purpose of placing a tidal power plant 1, which comprises a water turbine 2 and a nacelle 3, on a support structure, which holds the tidal power plant 1 in position during operation. For the illustrated embodiment, the tidal power plant 1 is placed on a tower 6 during installation. The tower is a component supported on the floor of a body of water in this case, which is associated with a gravity foundation for the foundation, for example. Alternatively, the tower 6 can have a monopile foundation. Such a foundation is shown in the following exemplary embodiments. However, other embodiments are also conceivable, such as a floating support structure anchored on the floor of the body of water, on which the tower 6 shown is placed. A connection is produced during the installation between the coupling device 4 on the nacelle 3 of the tidal power plant 1 and the coupling counterpart 5 on the tower 6 of the support structure.

The floating device 7 according to the invention encloses the nacelle 3 in the form of a bow having an opening pointing downward and extending axially to receive the nacelle 3. The floating device 7 is preferably designed so that there is a direct facility contact of the nacelle 3 at multiple points to the wall of the floating device 7. In addition, the coupling between the nacelle 3 and the floating device 7 is secured by multiple detachable coupling elements, which are not shown in detail.

In the fully submersed state, the installation unit 8 has a positive buoyancy, so that it can be drawn by means of a traction cable arrangement 9 against the action of the buoyancy force and the flow forces engaging on the installation unit 8 up to the coupling position. A traction cable arrangement 9 is used for this purpose, which preferably has an arrangement in pairs of traction cables 10.1, 10.2. These each extend from a tower-side linkage point 11 at least indirectly to the linkage points 13.1, 13.2, 13.3, and 13.4 on the floating device side. Multiple traction cables 10.1, 10.2 stabilize the drawing of the installation unit 8 toward the tower 6, since the buoyancy force on the installation unit 8 counteracts twisting of the parallel spaced-apart traction cables 10.1, 10.2. This effect can be reinforced by spacing the tower-side linkage points apart from the axis of the tower 6 by means of a boom 12.

For the preferred design of the traction cable arrangement 9 shown in FIG. 1, the traction cables 10.1, 10.2 run over deflection rollers 16.1, 16.2 to separately controllable motorized winches 14.1, 14.2. In order to additionally cause a traction effect on the further linkage points 13.2, 13.3 on the floating device side, they are connected by means of the fixed cables 15.1, 15.2 to the deflection rollers 16.1, 16.2. In this way, it is possible to reduce the weight of the motorized units in the form of the motorized winches 14.1, 14.2 to an arrangement in pairs and additionally to exert a force action on four points on the lower side of the floating device 7. A further advantage results with corresponding dimensioning of the lengths of the fixed cables 15.1, 15.2 for the final phase of the installation or for the beginning of the removal in direct proximity to the tower 6. This procedure will be explained in greater detail hereafter.

Figure 2:
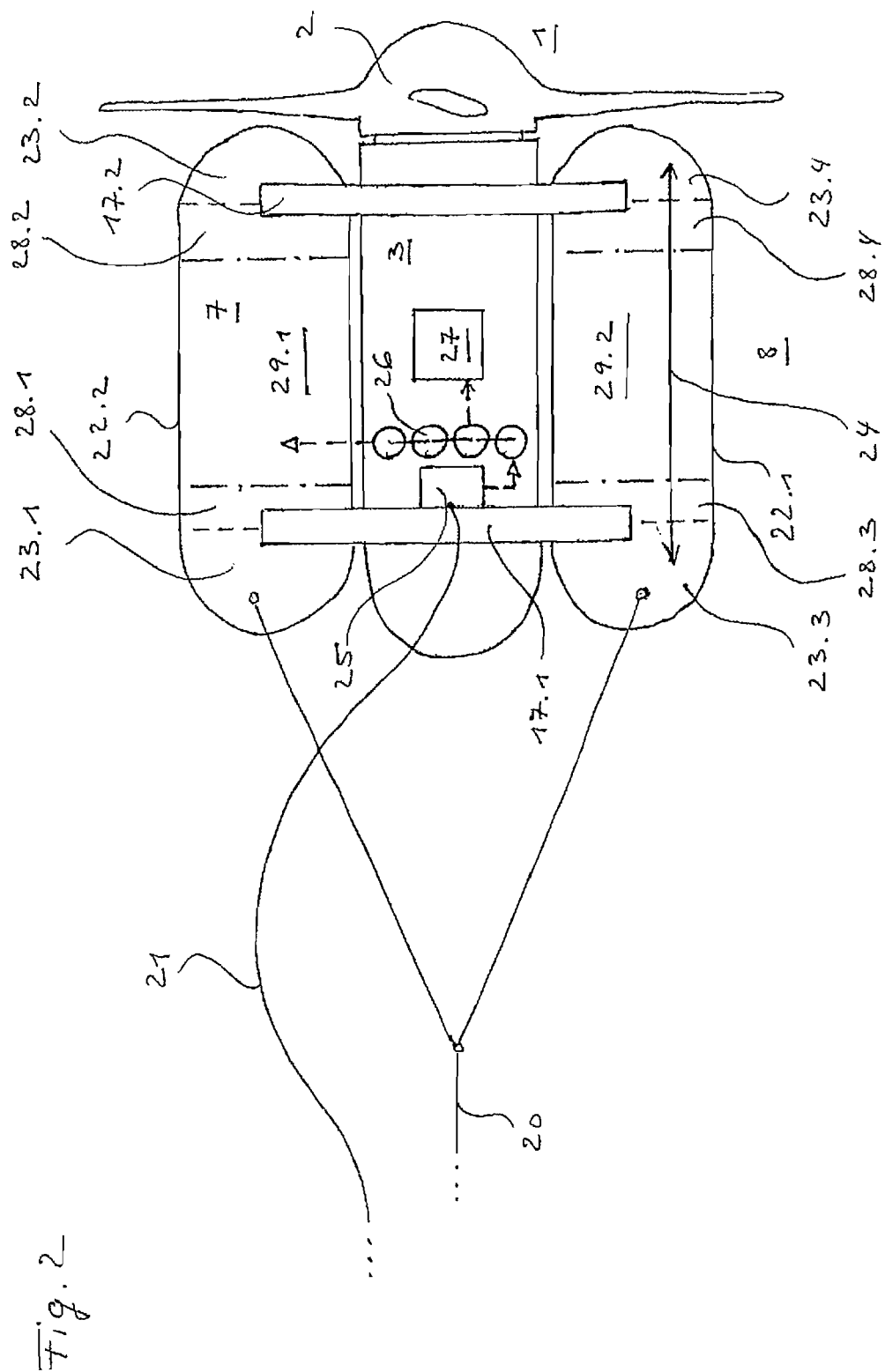
FIG. 2 shows a schematically simplified installation unit according to the invention in a top view.

FIG. 2 shows a top view of a schematic outline of the floating device 7, which is used for the installation, for a tidal power plant 1. The side tanks 22.1, 22.2 of the floating device 7, which are connected via crossbeams 17.1, 17.2, are shown. An intermediate space is formed in this way, which is open toward the bottom and is used to receive the nacelle 3 of the tidal power plant 1. The water turbine 2, which adjoins the nacelle 3 and is mounted therein, protrudes axially beyond this intermediate space and is located outside the dimensions of the floating device 7 because of its structural size.

Trimming tanks 23.1, 23.2, 23.3, 23.4, which each form a closed system in pairs, are located inside the side tanks 22.1, 22.2 at each of the axial ends. Thus, by means of the connection line 24 in the side tank 22.1, ballast water is pumped between the front trimming tank 23.3 and the rear trimming tank 23.4 to set a horizontal attitude of the installation unit 8. The trimming tanks 23.1 and 23.2 in the further side tank 22.2 work together correspondingly. A connection of all trimming tanks 23.1-23.4 is also conceivable, to achieve a balance in the transverse direction. This can be necessary under certain circumstances if the weight of a three-blade rotor of the water turbine 2, which is fixedly braked during the installation, for example, results in asymmetrical weight and buoyancy forces.

Furthermore, ballast tanks 28.1, 28.2, 28.3, 28.4 are provided on each of the side tanks 22.1, 22.2, which are flooded to initiate a submersion procedure. In addition, load compensation tanks 29.1, 29.2 are provided in each case, which compensate for the load change upon placement or accommodation of the tidal power plant 1. A compressed air supply 26 is accommodated in the floating device 7, which is operated via a measurement and control unit 25, to operate the ballast tanks 28.1, 28.2, 28.3, 28.4. This unit is in turn preferably connected via a supply line 21 to a ship vehicle, which is used for the purpose of ensuring the power supply for the floating device 7. Furthermore, at least a part of the control and regulating tasks required for the operation are relocated to the water surface, in order to make the floating device 7 as simple and therefore failsafe as possible.

Furthermore, a safety system 27 is outlined in FIG. 2, which can release additional buoyant bodies to secure the installation unit 8 in case of fault. The measuring and control unit 25, the compressed air supply 26, and the safety system 27 are preferably arranged in the area of the crossbeams 17.1, 17.2. A closed design of a crossbeam 17 according to the outline from FIG. 1 is particularly preferred, which allows foamed areas to be applied in the interior, which represent a safety reserve for the buoyancy for the case of a fault of the compressed air supply 26.

The installation unit 8 is towed in the floating state to the installation location. A towing cable 20 is outlined for this purpose, which is guided to a water vehicle (not shown in detail in FIG. 2). Furthermore, to improve the towing travel on the water surface, side rudders 19 are arranged on the outer sides of the side tanks 22.1, 22.2. These rudders are shown in FIG. 1.

The sequence of FIGS. 3a and 3b shows the initiation of the installation, FIG. 3a first showing the operating state suitable for the towing operation. A horizontally balanced floating position of the installation unit 8 is shown, the axial equilibrium of the coupled-on tidal power plant 1 being equalized by the selective adjustment of the fill level of the coupled trimming tanks 23.1, 23.2.

Furthermore, firstly the ballast tanks 28.1, 28.2 and the load compensation tank 29.1 are completely emptied, a buoyancy force $A_1$ and an operationally-reliable location of the buoyancy point 35 and the center of gravity 36 result in this way. To initiate the installation, the ballast tanks 28.1, 28.2 are filled, as shown in FIG. 3b. The ballast tanks are preferably dimensioned so that upon performance of complete filling, a positive buoyancy $A_2$ and an operationally-reliable location of the buoyancy point 35 relative to the center of gravity 36 also follow. If necessary, a change of the fill level in the trim tanks 23.1, 23.2 is to be performed with a further submersion of the floating device 7 and the components of the water turbine 2, which were previously still located above the water surface.

In the operating state outlined in FIG. 3b, the buoyancy is reduced sufficiently that it is possible to draw the installation unit to the coupling area on the tower 6. The positive buoyancy $A_2$ must also be continuously maintained, since a secured approach of the installation unit 8 to the tower presumes a permanent tension in the traction cable arrangement 9 and accordingly motorized drawing of the installation unit 8 to the tower 6.

FIG. 4 shows an already produced connection by means of the traction cable arrangement 9 between the tower 6 on the floor of the body of water 31 and the tower-side linkage point 11 provided there and the linkage points 13.1, 13.2 on the floating device side. To construct this traction cable arrangement 9, either a diving robot is used (not shown in detail) or there is a permanent connection between the tower-side linkage point 11 and the traction cable 10.1 attached thereto. It is conceivable to either hold the traction cable 10.1 via a buoy, which marks the installation location, at the free end on the water surface 30 until the execution of an installation for this purpose. Alternatively, the traction cable 10.1 fastened on the tower 6 can be laid using a remotely operated buoyancy unit during the erection of the tower 6 on the floor of the body of water 31. Furthermore, the use of a cable drum for the traction cable in the interior of the tower 6 is conceivable, which can be remotely operated via a radio connection, in order to wind an independently buoyant cable end up to the surface to initiate an installation.

According to the design shown in FIG. 4, the traction cable 10.1 of the traction cable arrangement 9 runs starting from the tower-side linkage point 11 via a deflection roller 16.1 to the motorized winch 14.1. This defines a first linkage point 13.1 on the floating device side. For a further linkage point 13.2, there is a connection by means of a fixed cable 15.1 having a fixed length up to the deflection roller 16.1. For the illustrated schematic simplification, only one traction cable 10.1 is shown. However, the use of an arrangement of at least two traction cables 10.1, 10.2 in pairs is preferred for the attitude stabilization in the course of drawing the floating device 7 toward the tower 6.

The installation is preferably executed in the case of a specific incident flow, in this case a flow direction 33 is to exist, which orients the installation unit 8 so that the water turbine 2 is on the lee side of the coupling device 4. An approach to the tower 6 occurs in this way, which keeps the water turbine 2 free of the retention structures. The flow condition suitable for the installation is selected so that a predetermined traction cable angle α of the traction cable 10.1 relative to the horizontal results. An angle range between 10° and 45° is preferred. Greater traction cable angles α result in the event of a lesser incident flow or in the event of an increase of the buoyancy of the installation unit 8. The connection to the tugboat 32 via the tow cable 20 is maintained until the incident flow conditions suitable for the installation exist. In addition, the positive buoyancy $A_2$ acting during the installation can be adapted to the existing incident flow so that the desired traction cable angle α results. Furthermore, the length of the fixed cable 15.1 up to the deflection roller 16.1 is selected in such a manner that a not insignificant wrap angle of the traction cable 10.1 on the deflection roller 16.1 is present for the selected traction cable angle α in the course of the entire tower approach.

For the actual installation, the installation unit 8 is then released by decoupling the tow cable 20, only the connection via the supply line 21 to the tugboat remaining, which has essentially no force action on the installation unit 8, however.

Furthermore, the power cable of the facility is preferably attached before the submersion, to simplify the illustration, such a cable is not shown in the figures.

After the capping of the traction connection via the tow cable 20 to the tugboat 32 and the pulling of the installation unit 8 to the tower 6, a decoupling from the weather and wave influences on the water surface 30 begins. This is significant in particular for the phase of the final approach, for which the actual coupling of the tidal power plant 1 on the tower 6 is performed. This is explained in greater detail hereafter on the basis of FIGS. 5a-5d.

The installation unit 8, as shown in FIG. 5a, is initially located above and on the lee side of the tip of the tower 6. With further hauling in of the traction cable 10.1 by means of the motorized winch 14.1, the successive approach of the coupling device 4 of the tidal power plant 1 to the coupling counterpart 5 on the tower 6 shown in FIGS. 5b and 5c occurs. The fixed cable 15.1 is preferably held under tension, which causes a not insignificant wrap angle of the traction cable 10.1 on the deflection roller 16.1. As shown in FIG. 5c, the length of the fixed cable 15.1 to the deflection roller 16.1 is selected so that upon a relocation of the deflection roller 16.1 into the proximity to the tower-side linkage point 11, the coupling device 4 of the tidal power plant 1 is directly over the coupling counterpart 5 on the tower 6. This presumes a predetermined trimming of the installation unit and a buoyancy $A_2$ adapted to the existing incident flow from the flow direction 33. These operating parameters are achievable by an adjustment of the water level in the trimming tanks 23.1-23.4, and the ballast tanks 28.1-28.4. Subsequently, an operational link is produced between the coupling device 4 of the tidal power plant 1 and the coupling counterpart 5 on the tower 6 by further hauling in of the traction cable 10.1. The deflection roller 16.1, as shown in FIG. 5d, is guided to the tower-side linkage point 11 and the fixed cable 15.1 therefore does not transmit any traction to the linkage point 13.2 on the floating device side, so that a pitching movement upon introduction of the coupling device 4 into the coupling counterpart 5 is possible in simplified form.

An alternative design, which is not shown in detail in the present case, provides traction cables which can be hauled in separately in each case in connection with motorized winches on each individual one of the linkage points 13.1, 13.2, 13.3, 13.4 on the floating device side, instead of the system having fixed cables 15.1 and deflection rollers 16.1. This solution does cause a higher weight of the motorized units and a higher control and regulation expenditure, however, in particular for the final approach phase, improved positioning capability of the coupling device 4 relative to the coupling counterpart 5 exists.

Preferably, the operating parameters required for the safe operation are detected by means of sensory systems on the floating device 7, which are not shown in detail. An incident flow sensor and an attitude sensor for trimming control come into consideration for this purpose. In addition, the final approach can be supported by a monitoring system based on image or sonar data. Furthermore, the coupling device 4 and the coupling counterpart 5 are preferably provided with a funnel-shaped capture area and conical running surfaces, so that upon further hauling in of the traction cable 10.1, the situation shown in FIG. 5d occurs, i.e., a connection between the coupling device 4 and the coupling counterpart 5. In addition, the coupling devices 4 and the coupling counterpart 5 are preferably designed so that a predetermined orientation according to the lock and key principle occurs automatically with the coupling. Alternatively, the suitable orientation of the tidal power plant can be produced by the flow forces during placement of the facility. As shown, the installation unit 8 is oriented parallel to the flow direction 33, which simultaneously represents a suitable operating position. The position caused by the flow is fixed in location by means (not shown in detail) for this embodiment to complete the coupling.

In FIGS. 6a-6c, the liftoff procedure of the floating device 7 occurring after the coupling of the tidal power plant 1 on the tower 6 is outlined. The starting point is firstly a completely hauled-in traction cable 10.1, the fixed cable 15.1 sags, since the deflection roller 16.1 has been guided directly up to the tower-side linkage point 11. In this state, the load change during the coupling is first prepared. For this purpose, filling of the load compensation tank is performed. This is illustrated by the dashed illustration of the load compensation tank 29.1, the weight of the ballast approximately corresponding to the weight of the tidal power plant 1 and the floating device 7 now being prepared for a reduced, but still positive buoyancy. Subsequently, by disengaging retention means (not shown in detail), the decoupling between the floating device 7 and the tidal power plant 1 is executed. The available buoyancy is preferably dimensioned so that friction forces are reliably overcome to disengage the retention means.

As shown in FIG. 6b, when the floating device 7 is lifted off of the installed tidal power plant 1, tensioning of the fixed cable 15.1 occurs. Through controlled unwinding of the traction cable 10.1 on the motorized winch 14.1, the floating device 7 is moved up to the water surface 7. For this retrieval of the floating device 7, one waits for a change in the incident flow direction 33, in order to ensure that no collision with the water turbine 2 can occur as the floating device 7 floats free.

Figure 7C:
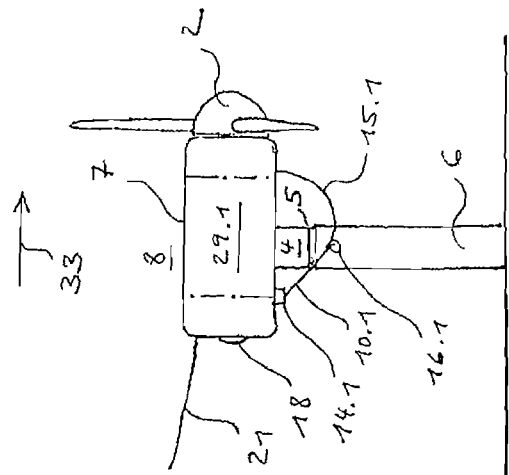
FIGS. 7a-7c show the coupling of a floating device according to the invention to a tidal power plant located in the operating position to execute a removal of the facility.
Figure 7B:
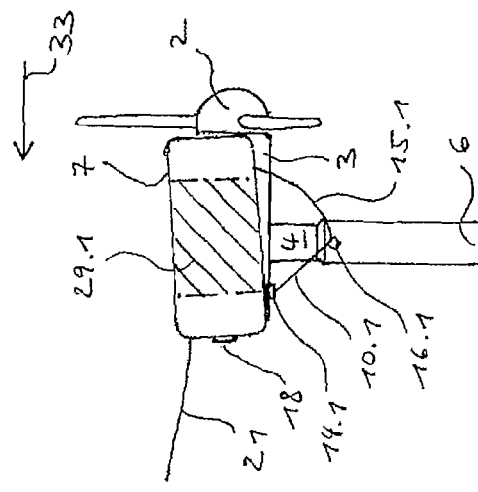
Figure 7A:
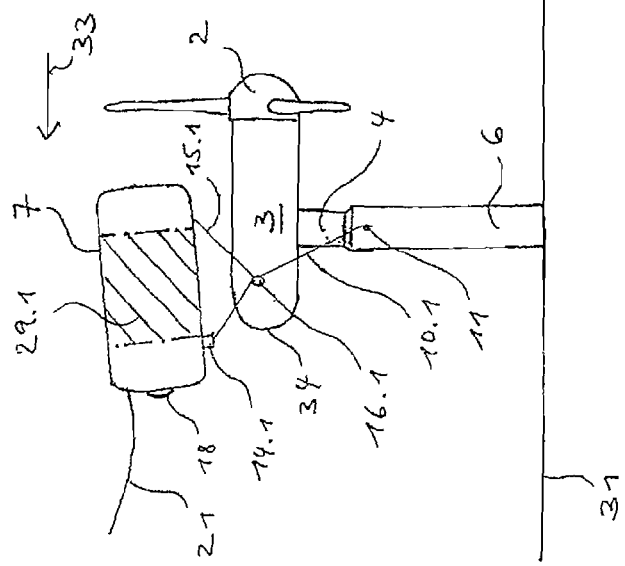

FIGS. 7a-7c show the removal of a tidal power plant 1 located in the operating position as a refinement of the method according to the invention, in order to be able to execute a facility replacement or a service above the water level. For this purpose, as shown in FIG. 7a, the floating device 7 is first drawn using the traction cable 10.1 to the nacelle 3 of the tidal power plant 1. One waits for a flow direction 33, which conveys the floating device 7 to the lee side of the water turbine 2. A not insignificant wrap angle of the traction cable 10.1 is preferably again present on the deflection roller 16.1.

In addition to the approach from the rear, the trimming of the floating device 7 is controlled so that the end pointing toward the water turbine 2 is somewhat higher than the diametrically opposite end facing away from the water turbine 2. Through this inclined attitude, the situation outlined in FIG. 7b occurs upon further hauling in of the traction cable 10.1. The floating device 7 is first seated on the end of the nacelle 3 facing away from the water turbine 2. An axial stop 18 is preferably provided in this area on the floating device 7, which is shown in greater detail in FIG. 1. This axial stop 18 ensures that the nacelle housing terminus 34 on the side of the nacelle housing 3 diametrically opposite to the water turbine 2 does not extend beyond the predefined axial extension of the floating device 7. If the mentioned axial stop 18 is drawn into contact in relation to the nacelle housing terminus 34, a defined relative location is provided in the axial direction between the floating device 7 and the nacelle 3, which allows coupling means (not shown in detail) provided for the first contact to be closed. A horizontal orientation of the floating device 7 is then performed by an appropriate adaptation in the trimming tanks, until the floating device 7 is completely supported on the nacelle 3 shown in FIG. 7c. All coupling means between the floating device 7 and the tidal power plant 1 can then be closed.

Before the installation unit 8 can be lifted off of the tower 6 in a further step, one preferably again waits for a change of the incident flow direction 33, so that it is ensured that the water turbine 2 comes free from the tower 6 without contact. Furthermore, the load compensation tank 29.1 is purged before the liftoff, in order to take the accommodated weight of the tidal power plant 1 into consideration and ensure a positive buoyancy of the installation unit 8. Furthermore, it is necessary under certain circumstances to overcome the friction forces between the coupling device 4 and the tower-side coupling counterpart 5 in a controlled manner. Actuators (not shown in detail) can be provided for this purpose in the area of the coupling connection.

According to a refinement of the invention, the floating device 7 can be designed as adaptable for different tidal power plants 1 having differently dimensioned nacelles and deviating weight. For this purpose, it is conceivable to make the dimension of the receiving channel between the side tanks 22.1, 22.2 adjustable by movable crossbeams 17.1, 17.2. An adaptation to different facility weights and axial weight distributions can be achieved via the controller of the ballast and trimming tanks. Furthermore, the floating device 7 can be equipped with additional apparatuses which are used for facility maintenance underwater. For this purpose, after the docking of the floating device 7 on the tidal power plant 1 located in the operating position, for example, a replacement of operating media can be performed. Furthermore, it is possible to inject cleaning media under pressure into the interior of the nacelle 3 from the floating device 7 after the coupling to remove maritime growth. Furthermore, a refinement of the invention is possible in which the floating device 7 is additionally provided with a diving bell, which offers service technicians a dry workspace, which is fixed in location relative to the tidal power plant 1, to execute maintenance work after the coupling.

LIST OF REFERENCE SIGNS 1 tidal power plant
2 water turbine
3 nacelle
4 coupling device
5 coupling counterpart
6 tower
7 floating device
8 installation unit
9 traction cable arrangement
10.1, 10.2 traction cable
11 tower-side linkage point
12 boom
13.1, 13.2, 13.3, 13.4 linkage point on the floating device side
14.1, 14.2 motorized winch
15.1, 15.2 fixed cable
16.1, 16.2 deflection roller
17, 17.1, 17.2 crossbeam
18 axial stop
19 side rudder
20 tow cable
21 supply line
22.1, 22.2 side tank
23.1, 23.2, 23.3, 23.4 trimming tank
24 connection line
25 measurement and control unit
26 compressed air supply
27 safety system
28.1, 28.2, 28.3, 28.4 ballast tank
29.1, 29.2 load compensation tank
30 water surface
31 floor of body of water
32 tugboat
33 flow direction
34 nacelle housing terminus
35 buoyancy point
36 center of gravity
$A_1$, $A_2$ buoyancy
$\alpha$ traction cable angle

The invention claimed is:

1. A method for removing a tidal power plant having a water turbine, which is mounted so it is rotatable on a nacelle, the nacelle being connected using a coupling device to a coupling counterpart on a tower, which carries the tidal power plant during operation, the method comprising:
    drawing up a floating device having a positive buoyancy to a contact with the nacelle using a traction cable arrangement connected to the tower and a motorized winch accommodated in the floating device;
    coupling the floating device to the nacelle of the tidal power plant to provide an installation unit;
    lifting the installation unit off of the tower by unwinding the traction cable arrangement and guided up to the water surface;
    wherein a trimming system having trimming tanks assigned to the floating device, which adjusts an attitude of the floating device upon approach to the nacelle at such an angle to the horizontal that the contact between the floating device and the nacelle occurs on the nacelle in an end facing away from the water turbine, and wherein an axial stop on the floating device is brought into contact with a nacelle housing terminus on an end of the nacelle diametrically opposite to the water turbine.

2. The method according to claim 1, wherein after the contact between the floating device and the nacelle, the floating device is moved into a horizontal attitude.

3. The method according to claim 1, wherein after the coupling between the floating device and the nacelle, at least one load compensation tank of the floating device is emptied.

4. The method according to claim 1, wherein the installation unit is lifted off of the tower, after a change in tidal flow direction.

5. A device for removing a tidal power plant having a water turbine, which is mounted so it is rotatable on a nacelle, the nacelle being connected using a coupling device to a coupling counterpart on a tower, which carries the tidal power plant during operation, the device comprising:

a floating device having a positive buoyancy and configured to be drawn up to contact with the nacelle using a traction cable arrangement connected to the tower and a motorized winch accommodated in the floating device, and the floating device configured to be coupled to the nacelle of the tidal power plant to provide an installation unit configured to be lifted off of the tower by unwinding the traction cable arrangement and guided up to the water surface; and a trimming system having trimming tanks assigned to the floating device, which adjusts an attitude of the floating device upon approach to the nacelle at such an angle to the horizontal that the contact between the floating device and the nacelle occurs on the nacelle in an end facing away from the water turbine;

wherein an axial stop on the floating device is brought into contact with a nacelle housing terminus on an end of the nacelle diametrically opposite to the water turbine.

6. The device according to claim 5, wherein after the contact between the floating device and the nacelle, the floating device is configured to move into a horizontal attitude.

7. The device according to claim 5, wherein after the coupling between the floating device and the nacelle, at least one load compensation tank of the floating device is emptied.

8. The device according to claim 5, wherein the installation unit is lifted off of the tower, after a change in tidal flow direction.

* * * * *